United States Patent [19]

Ferguson

[11] Patent Number: 5,301,606
[45] Date of Patent: Apr. 12, 1994

[54] HEAT-ACTIVATED SMOKE GENERATING DEVICE

[76] Inventor: George E. Ferguson, 7740 E. Glenrosa, No. 112, Scottsdale, Ariz. 85251

[21] Appl. No.: 33,149

[22] Filed: Mar. 16, 1993

Related U.S. Application Data

[62] Division of Ser. No. 787,041, Nov. 4, 1991, Pat. No. 5,193,445.

[51] Int. Cl.$^5$ .............................................. A23L 1/01
[52] U.S. Cl. .................................. 99/482; 206/524.6; 239/136
[58] Field of Search ............. 99/482; 126/25 R, 41 R, 126/59.5; 206/524.4, 524.6; 239/55, 57, 60, 566, 136; 426/235, 314, 315

[56] References Cited

U.S. PATENT DOCUMENTS

| | | | |
|---|---|---|---|
| 2,435,756 | 2/1948 | Schlesinger | 239/136 |
| 2,967,023 | 1/1961 | Huckabee | 99/482 |
| 3,593,647 | 7/1971 | Copeland, Jr. | 99/482 |
| 3,788,301 | 1/1974 | Terry | 99/482 |
| 4,462,307 | 7/1984 | Wells | 99/482 |
| 4,779,525 | 10/1988 | Gaines | 99/482 |
| 5,048,406 | 9/1991 | Cofer | 99/482 |

Primary Examiner—Harvey C. Hornsby
Assistant Examiner—Mark Spisich
Attorney, Agent, or Firm—David G. Rosenbaum

[57] ABSTRACT

An apparatus and method for releasing a heat-activated gas from a heat activated gas-emitting medium in response to application of heat. The invention relates specifically to an apparatus and a method for flavoring foods during a cooking process. The apparatus consists of a housing made of a thermally conductive material and a pyrolytic or combustible cartridge which is removably inserted into the housing.

12 Claims, 2 Drawing Sheets

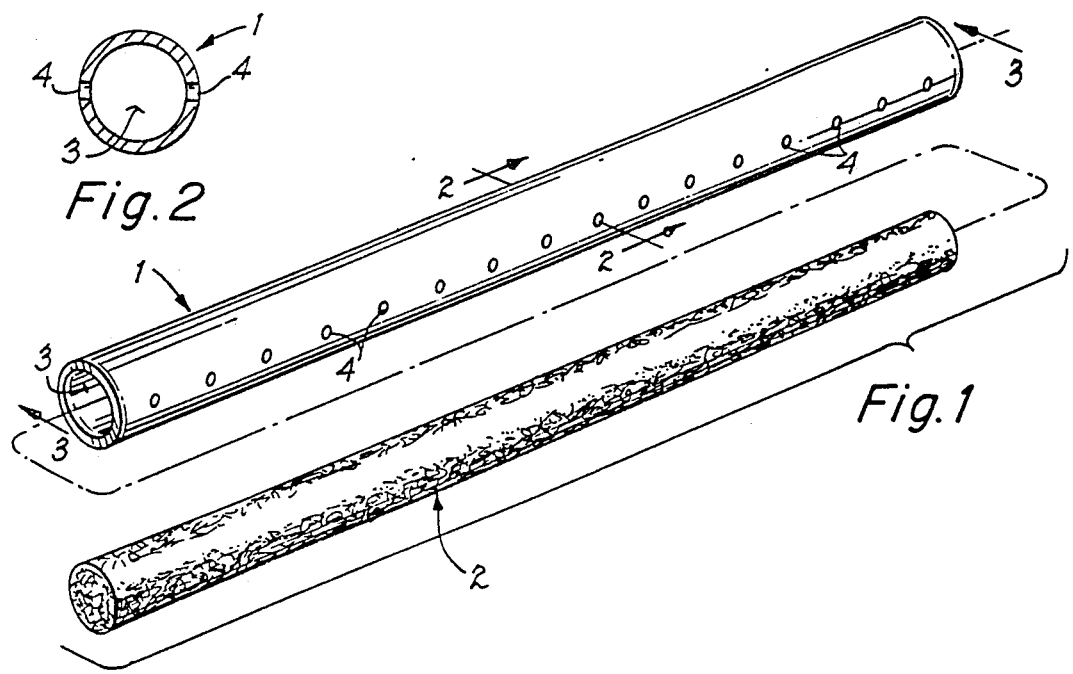
Fig. 2
Fig. 1
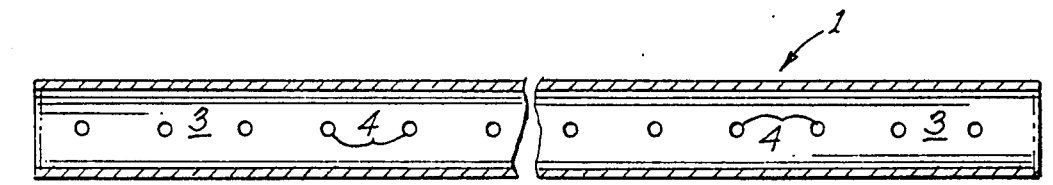
Fig. 3
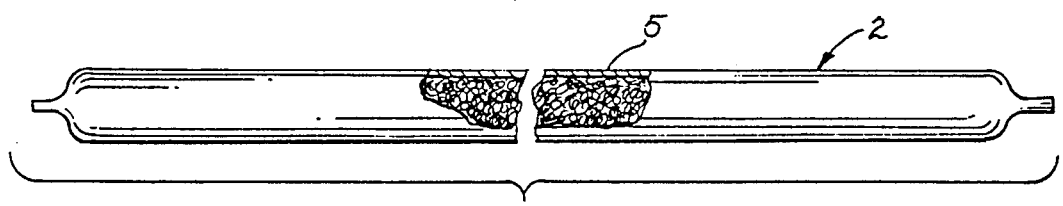
Fig. 4
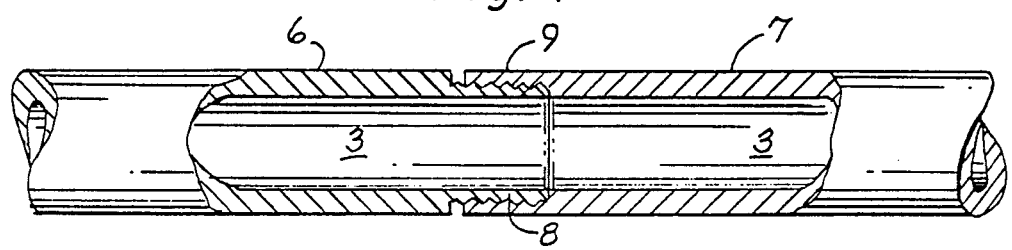
Fig. 5

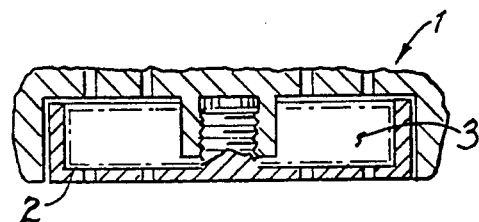
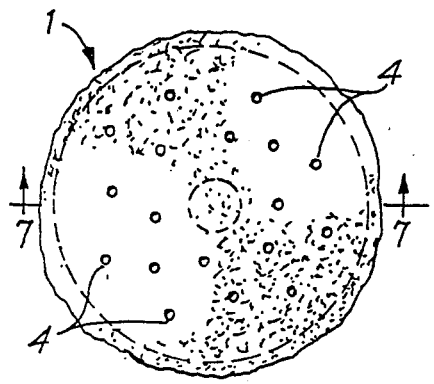
Fig. 6
Fig. 7
Fig. 9
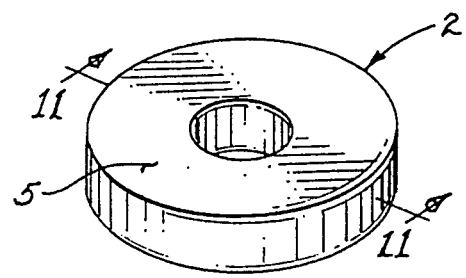
Fig. 10
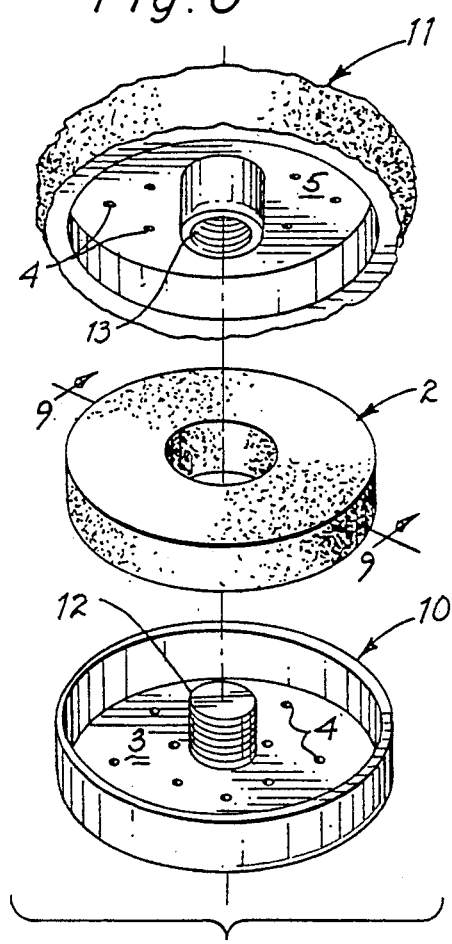
Fig. 11
Fig. 8

HEAT-ACTIVATED SMOKE GENERATING DEVICE

This is a divisional of copending application Ser. No. 07/787,041 filed on Nov. 4, 1991, now U.S. Pat. No. 5,193,445.

BACKGROUND OF THE INVENTION

The present invention relates generally to devices used to generate aromatic gases or smokes which add to or enhance the flavor of food, provide an aromatic scent in the ambient environment, or provide a visually pleasing coloration to flames. More particularly, the present invention provides an easy-to-use and reusable device that imparts gaseous flavoring, such as the traditional "smoke" flavoring, to foods that are prepared in cooking devices such as charcoal and gas barbecue grills, conventional ovens, and the like. Additionally, the present invention provides a device which may be used to emit a pleasing aromatic scent into the air or to provide coloration to flames, such as in a fireplace.

Several cumbersome and complicated techniques and devices for generating an aromatic flavoring gas are presently in existence, including those that require loose flavoring chips or particles, flavoring liquids, additional energy sources for combustion of the flavoring medium, bulky equipment that consumes considerable space in the cooking chamber, and units that must be disposed of when the flavoring medium is consumed.

In U.S. Pat. No. 4,869,163, Haskins teaches a smoking unit limited to use in gas grills and of such size and configuration that it renders unusable a considerable portion of the cooking space within the gas grill. Haskins' device also operates with inconvenient loose wood chips and flavoring liquids as the necessary flavoring mediums. This unit is laborious to operate and economically inefficient to obtain the desired results when compared with the present invention.

Gaines in U.S. Pat. No. 4,779,525, Huckabee in U.S. Pat. No. 2,967,023 teach smoke producing devices for use in barbecue grills or the like. These devices use loose smoke producing mediums, such as wood chips, that are encased in non-reusable perforated covers.

In U.S. Pat. No. 4,697,506, Ducate teaches a tray for flavoring food with burning woodchips that is limited to use in barbecue grills and that is of such size and configuration that it renders unusable a considerable portion of the cooking space within the barbecue grill. This device also operates with inconvenient loose wood chips or particles, and is cumbersome to operate.

In U.S. Pat. No. 4,374,489, Robbins teaches an adaptable food smoker attachment that is attachable to the underside of certain cooking grills. This device requires the use of hardwood flakes or fine particles as the flavoring medium, and an additional energy source to cause the smoldering of the flavoring medium. This device is cumbersome to use and economically inefficient to obtain the desired results when compared with the present invention.

SUMMARY OF THE INVENTION

It has now been determined that flavor can be imparted to foods during the cooking process through an improved device which overcomes the numerous drawbacks found in the prior art. Additionally, it has been found that the same device can be used to generate an aromatic gaseous scent in the ambient room air, or to impart a color to flames, such as in a fireplace.

One object of the present invention is to provide a reusable device that maximizes food flavoring capacity and ease of use while minimizing the size and cost of the unit.

Another object of the present invention is to provide convenient, uniform members made into sticks, discs or other shapes and made of natural or synthetic materials containing natural or synthetic aromatic compounds which emit a smoke, aroma or color upon exposure to heat.

Another object of the present invention is to provide a device which is configured to occupy a minimal amount of space within a cooking chamber or fireplace.

Another object of the present invention is to provide a device that can be placed directly on a heat-generating element or directly within flames.

Another object of the present invention is to provide a device that may be used in charcoal grills, gas grills, conventional ovens, open fire or virtually any type of cooking unit.

Another object of the present invention is to provide a device that requires n additional energy source apart from the heat in the cooking chamber to activate the compressed members thereby releasing the smoke, aromatic or colorant compounds.

These and other objects, features and advantages of the present invention will become more readily apparent from the following detailed description, which proceeds with reference to the accompanying drawings.

BRIEF DESCRIPTION OF THE DRAWINGS

FIG. 1 is a perspective exploded view of a food flavoring device according to the present invention.

FIG. 2 is a cross-sectional view taken along lines 2—2 of FIG. 1.

FIG. 3 is a cross-sectional view taken along lines 3—3 of FIG. 1.

FIG. 4 is an elevational view of an alternative embodiment of a flavoring stick of the present invention.

FIG. 5 is an elevational partial cross-sectional view of a second embodiment of the food flavoring device of the present invention.

FIG. 6 is a top elevational view of a third embodiment of the food flavoring device of the present invention.

FIG. 7 is a cross-sectional view taken along line 7—7 of FIG. 6.

FIG. 8 is an exploded view of the third embodiment of the present invention.

FIG. 9 is a cross-sectional view taken along line 9—9 of FIG. 8.

FIG. 10 is a perspective view of an alternative embodiment of flood flavoring disk useable with the third embodiment of the invention.

FIG. 11 is a cross-sectional view taken along line 11—11 of FIG. 10.

DETAILED DESCRIPTION OF THE PREFERRED EMBODIMENTS

A first preferred embodiment of the invention is illustrated with reference to FIGS. 1–5 of the accompanying drawings. A second preferred embodiment of the invention is illustrated with reference to FIGS. 6–11 of the accompanying drawings. Like features are identified by like reference numerals in the drawings.

The food flavoring device 10 of the present invention consists generally of a housing 1, made of a material sufficient to withstand the heat generated by a heat source, such as a fire, coal or gas barbecue, oven, etc.. At least one heat-activated gas-emitting member 2 is inserted into the housing 1. The gas-emitting member 2 may be configured into a cartridge having a shape, such as rods, sticks, disks, or other shape which is adapted to fit and reside within the housing 1. Generally, housing 1 provides a hollow cavity 3 of sufficient shape and size to enclose cartridge 2 and of sufficient internal surface area and heat transfer characteristics as to activate gas-emitting member or cartridge 2. A plurality of openings 4 are provided through housing 1 and communicate between the outside surface of the housing 1 to its interior hollow cavity 3. Openings 4 serve to release gases generated by the heat activate member 2 from the hollow cavity 3 external to the housing 1.

As illustrated in FIGS. 1, 8 and 9, heat activated member 2 may be comprised of naturally or synthetically scented compressed pyrolitic or combustible particulate matter, such as wood shavings which release non-toxic gas containing the gaseous compound desired to be released. Cartridge 2 may also be comprised of a loose or compacted particulate matter that is confined in a combustible or frangible covering enclosure 5 as shown in FIGS. 4, 10 and 11. Cartridge 2 is configured to conform to the size, shape, and configuration of interior hollow cavity 3 of smoking housing 1. The configuration of the cartridge 2 is selected to match the configuration of the housing 1 and the hollow cavity 3, so as to be easily and wholly inserted into housing 1.

With cartridge 2 in place, housing 1 may be placed within the heat source, such as a cooking chamber of a cooking device, such as a barbecue grill. Upon exposure to the heat generated by the cooking device, cartridge 2 will release its gaseous smoke, aroma or colorant, either by pyrolysis or combustion, and the flavoring, aromatic or colorant compound naturally or synthetically impregnated into the particulate matter will be released.

In the first preferred embodiment illustrated with reference to FIG. 1, cartridge 2 is slidably inserted into housing 1. In this embodiment, housing 1 consists generally of a tubular member defining an inner hollow lumen 3. As illustrated in FIGS. 1 and 5, housing 1 may be a single tubular member, or a plurality of tubular members capable of interconnection in co-axial fashion. Cartridge 2, according to this preferred embodiment, will be configured as an elongated cylindrical member and may take the form of a compressed particulate cartridge as shown in FIG. 1 or one formed from loose particulate enclosed in a combustible or frangible material 5 as shown in FIG. 4.

In the embodiment of FIG. 5, housing 1 is comprised of linear tubular members 6 and 7 that are joinable couplings associated with ends of the linear tubular members 6 and 7. Joinable couplings may consist of a male threaded end 8 on tubular member 6 and a mating female threaded end 9 on tubular member 7. By providing a plurality of linear tubular members 6 and 7, and couplings to removably couple the linear tubular members in co-axial fashion, the user may vary the length of the device 10 to accommodate a particular application, such as different sized cooking chambers of barbecues, fireplaces, etc.

A second preferred embodiment of the invention is illustrated with reference to FIGS. 6–11. In this second embodiment the housing 1 is comprises generally of a top member 11 and a base or bottom member 10 which are cooperatively joinable through a coupling 12 and 13. Each of the top and base members and 10 have associated hollow cavities 5, 3, respectively. The hollow cavity 3 of base member 10 is configured to accept a cartridge 2 within the cavity 3. The hollow cavity 5 of top member 11 is, in turn, configured to accommodate the base member 10 therein.

As illustrated in FIGS. 7 and 8, cartridge 2 resides within base member 10, and base member 10 couples to top member 11 via couplings such as a male threaded member 12 projecting centrally into hollow cavity 3, and a female threaded member 13 depending centrally into hollow cavity 5. Those in the art will understand that other types of couplings between top member 11 and base member 10 are contemplated within the invention. Non-limiting examples of such alternative couplings include friction fittings associated with central projections from each of the top and base members 11 and 10, respectively; friction fittings associated with peripheral edges of the top and base members 11 and 10, or cooperating threads associated with peripheral edges of the top and base members 11 and 10.

Another aspect of this second preferred embodiment resides in the shape and design texture of the top and/or base members 11 and 10. As illustrated in FIGS. 6, 7 and 11, the top member 11 may be provided with a mottled, stippled or otherwise uneven exterior surface texture and appearance, and may be colored, such as by powder coating metal, to provide the appearance of a piece of meat, such as a hamburger. The exterior surface texture may be imparted by molding or casting the material used to form housing 1 or the top and/or bottom members 11 and 10.

In the illustrated embodiment, cartridge 2 is configured as an annular disk wherein the centrally disposed couplings 12, 13 pass through the annular opening in the cartridge 2 and engage therebetween. Where, however, alternative couplings are employed, such as peripheral friction fittings or cooperating threads, cartridge 2 may be alternatively configured as a solid disk, due to elimination of the need for the annular opening.

While the present invention has been described above with reference to its preferred embodiments, those skilled in the art will understand and appreciate that variations may be made, including but not limited to variations in design, detail, size, shape, and choice of materials for manufacture, with the resulting device still falling within the spirit and scope of the present invention which is intended to be limited only by the following claims.

What is claimed is:

1. An apparatus for releasing a gas upon exposure to heat, comprising:
   (a) housing having an accessible interior cavity formed by a top member and a base member, wherein each of said top member and said base member have a plurality of openings passing therethrough, and coupling means associated therewith for removably coupling said top member to said base member; and
   (b) heat activated means disposed within said interior cavity of said housing for releasing at least one gaseous compound upon exposure to a heat source, wherein said heat activiated means comprises a removable cartridge which comprises a container that holds one of the group consisting of a compressed media and loose particulate matter.

2. The apparatus according to claim 1, wherein said top member further comprises a generally planar body having upper and lower surfaces thereof and having a recess cavity defined in the lower surface thereof.

3. The apparatus according to claim 2, wherein said base member further comprises a generally planar body having upper and lower surfaces thereof, and having a recess cavity defined in the upper surface thereof.

4. The apparatus according to claim 3, wherein each of said top member and said base member further comprise generally circular planar bodies, and said base member is co-axially and removably accommodated within said recess cavity of said top member.

5. The apparatus according to claim 1, wherein said top member further comprises one of the group consisting of mottling, stippling and coloring on an exterior surface thereof to provide said apparatus with an appearance of a piece of meat.

6. The apparatus according to claim 1, wherein said compressed media or particulate matter further comprises one of the group consisting of a pyrolytic and combustible medium, said medium emitting one of the group consisting of a gaseous smoke, aroma and color upon exposure to heat.

7. An apparatus for generating smoke within a cooking chamber, which comprises:
(a) a thermally conductive housing having an interior chamber formed by a top member and a base member, each of said top member and said base member having a plurality of openings therethrough which provide gas-flow communication means between said interior chamber and external to said housing wherein each of said top member and said base member have coupling means associated therewith for removably coupling said top member to said base member; and
(b) a heat activated scented smoke generating cartridge comprising one of the group consisting of a pyrolytic and combustible medium, said cartridge being disposed within said interior chamber of said housing.

8. The apparatus according to claim 7, wherein said top member further comprises a generally planar body having upper and lower surfaces thereof and having a recess cavity defined in the lower surface thereof.

9. The apparatus according to claim 8, wherein said base member further comprises a generally planar body having upper and lower surfaces thereof, and having a recess cavity defined in the upper surface thereof.

10. The apparatus according to claim 9, wherein each of said top member and said base member further comprises generally circular planar bodies, and said base member is co-axially and removably accommodated within said recess cavity of said top member.

11. The apparatus according to claim 7, wherein said top member further comprises one of the group consisting of mottling, stippling and coloring on an exterior surface thereof to provide said apparatus with an appearance of a piece of meat.

12. The apparatus according to claim 7, wherein said pyrolytic or combustible medium emits one of the group consisting of a gaseous smoke, aroma and color upon exposure of heat.

* * * * *